United States Patent
Kakihara et al.

(10) Patent No.: US 6,538,860 B1
(45) Date of Patent: Mar. 25, 2003

(54) SPIN-VALVE TYPE MAGNETORESISTIVE ELEMENT CAPABLE OF PREVENTING BARKHAUSEN NOISE

(75) Inventors: Yoshihiko Kakihara, Niigata-ken (JP); Kiyoshi Sato, Niigata-ken (JP)

(73) Assignee: Alps Elctric Co., Ltd., Tokyo (JP)

( * ) Notice: Subject to any disclaimer, the term of this patent is extended or adjusted under 35 U.S.C. 154(b) by 220 days.

(21) Appl. No.: 09/644,720

(22) Filed: Aug. 23, 2000

(30) Foreign Application Priority Data

Aug. 30, 1999 (JP) .......................................... 11-242732

(51) Int. Cl.⁷ ................................................ G11B 5/39
(52) U.S. Cl. .................................................. 360/324.12
(58) Field of Search ..................................... 360/324.12

(56) References Cited

U.S. PATENT DOCUMENTS

| | | | |
|---|---|---|---|
| 5,206,590 A | | 4/1993 | Dieny et al. |
| 5,583,725 A | | 12/1996 | Coffey et al. |
| 5,761,010 A | | 6/1998 | Mimura |
| 5,910,344 A | | 6/1999 | Hasegawa et al. |
| 5,949,623 A | * | 9/1999 | Lin .................. 360/324.12 |
| 5,972,420 A | | 10/1999 | Saito et al. |
| 6,074,767 A | * | 6/2000 | Lin .................. 360/324.12 |
| 6,295,186 B1 | | 9/2001 | Hasegawa et al. |

FOREIGN PATENT DOCUMENTS

JP     6-301937     10/1994

* cited by examiner

Primary Examiner—A. J. Heinz
(74) Attorney, Agent, or Firm—Brinks Hofer Gilson & Lione

(57) ABSTRACT

A magnetoresistive element includes a nonmagnetic conductive layer, first and second ferromagnetic layers which are conductive and which sandwich the nonmagnetic conductive layer, an antiferromagnetic layer magnetically coupled to the first ferromagnetic layer for fixing the magnetization direction of the first ferromagnetic layer, a bias layer magnetically coupled to the second ferromagnetic layer for aligning the magnetization direction of the second ferromagnetic layer in a direction crossing to the magnetization direction of the first ferromagnetic layer, and a pair of electrode layers for applying a sensing current to the first and second ferromagnetic layers and the nonmagnetic conductive layer. The antiferromagnetic layer, the first ferromagnetic layer, the nonmagnetic conductive layer, the second ferromagnetic layer, and the bias layer are deposited in that order. The pair of electrode layers are disposed on both ends of the bias layer, and the bias layer at a position which is not covered by the pair of electrode layers is modified to form a nonmagnetic layer for determining a track width. A method of fabricating the magnetoresistive element is also disclosed.

5 Claims, 11 Drawing Sheets

FIG. 6
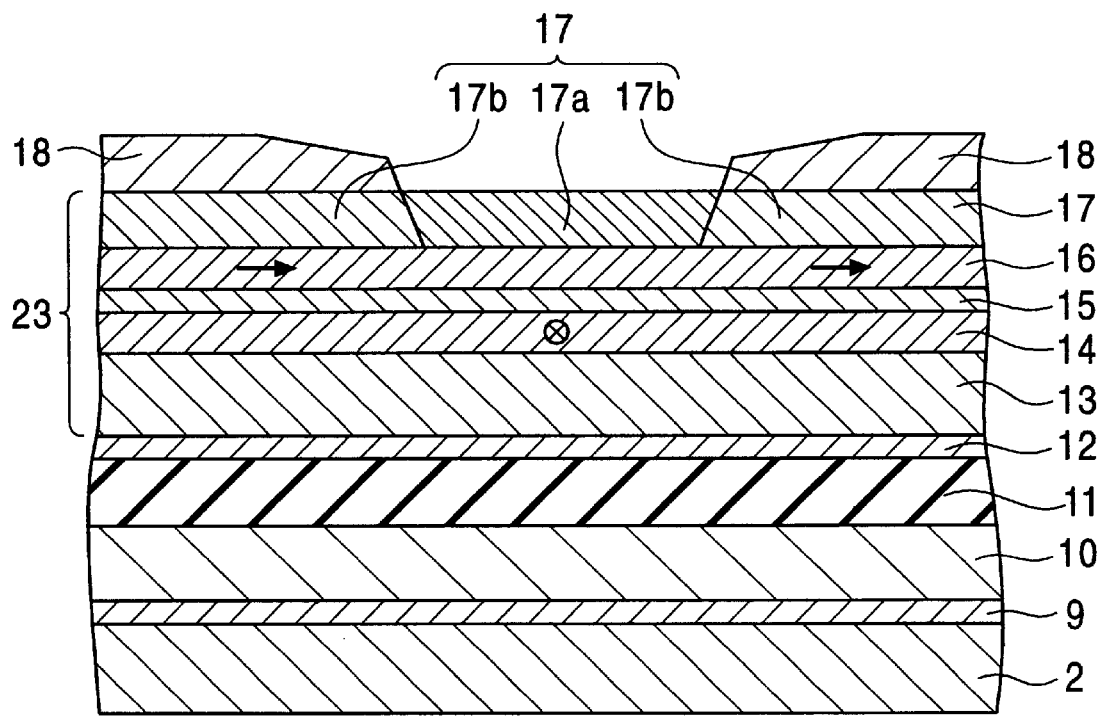
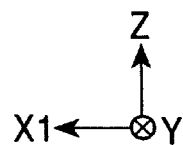

SPIN-VALVE TYPE MAGNETORESISTIVE ELEMENT CAPABLE OF PREVENTING BARKHAUSEN NOISE

BACKGROUND OF THE INVENTION

1. Field of the Invention

The present invention relates to a magnetoresistive element used for a magnetic head and the like, and more particularly, the invention relates to a magnetoresistive element utilizing a spin-valve effect and to a method of making the same.

2. Description of the Related Art

Magnetoresistive elements are increasingly used for magnetic heads in magnetic disk units and the like because of their high magnetic field sensitivity. FIG. 8 is a sectional view of a magnetic core of a magnetic head using a conventional magnetoresistive element, viewed from the surface facing a magnetic disk. A magnetic core 31, which includes a read head 32 and a write head 33, is provided on the trailing end of a slider 34. The magnetic core 31 and the slider 34 constitute a magnetic head 35.

In the read head 32, an underlying layer 36, a lower shielding layer 37, a lower gap layer 38, an underlying layer 39, an antiferromagnetic layer 40, a first ferromagnetic layer 41, a nonmagnetic conductive layer 42, and a second ferromagnetic layer 43 are deposited in that order on the trailing end of the slider 34, and a pair of bias layers 44 are placed on both sides of the second ferromagnetic layer 43 with a distance corresponding to a track width T of the magnetic disk therebetween. An electrode layer 45 is formed on each bias layer 44, and an upper gap layer 46 is deposited so as to cover the electrode layers 45 and the second ferromagnetic layer 43 located therebetween. An upper shielding layer 47 which also acts as a lower core layer of the write head 33 is deposited on the upper gap layer 46.

In the write head 33, a gap layer 48 is formed on the lower core layer 47, and an upper core layer 49 is formed thereon.

The antiferromagnetic layer 40, the first ferromagnetic layer 41, the nonmagnetic conductive layer 42, the second ferromagnetic layer 43, the pair of bias layers 44, and the pair of electrode layers 45 constitute a magnetoresistive element 50.

The first ferromagnetic layer 41 is composed of, for example, a Co film, an NiFe alloy, a CoNiFe alloy, a CoFe alloy, or a CoNi alloy. The antiferromagnetic layer 40 is composed of a PtMn alloy or the like. The bias layers 44 are composed of a conductive antiferromagnetic material, such as an IrMn alloy or an FeMn alloy.

The first ferromagnetic layer 41 shown in FIG. 8 is magnetized by an exchange anisotropic magnetic field due to exchange coupling occurring at the interface with the antiferromagnetic layer 40, and the antiferromagnetic layer 40 and the first ferromagnetic layer 41 are magnetically coupled to each other. The magnetization direction of the first ferromagnetic layer 41 is fixed in the Y direction in the drawing, i.e., in the direction crossing to the magnetic disk (in the height direction) by the coupling.

The second ferromagnetic layer 43 is magnetized by an exchange anisotropic magnetic field of the pair of bias layers 44, is magnetically coupled to the pair of bias layers 44 in regions in which the second ferromagnetic layer 43 is in direct contact with the pair of bias layers 44, and is aligned in a single-domain state as a whole. The magnetization direction of the second ferromagnetic layer 43 is aligned in the direction opposite to the X1 direction in the drawing, i.e., in the direction crossing to the magnetization direction of the first ferromagnetic layer 41. Due to the single-domain state, in the regions in which the second ferromagnetic film 43 and the pair of bias layers 44 are in direct contact with each other, the magnetization direction of the second ferromagnetic layer 43 is fixed in the direction opposite to the X1 direction in the drawing, and domain walls are inhibited from appearing in the second ferromagnetic layer 43, and thus Barkhausen noise is prevented from occurring.

In the magnetoresistive element 50, a sensing current (steady-state current) is applied from the electrode layer 45 to the second ferromagnetic layer 43, the nonmagnetic conductive layer 42, and the first ferromagnetic layer 41, and when a fringing magnetic field from a magnetic disk which rotates and travels in the Z direction is applied in the Y direction in the drawing, the magnetization direction of a portion of the second ferromagnetic layer 43 which is not in direct contact with the pair of bias layers 44 changes from the direction opposite to the X1 direction in the drawing to the Y direction. Because of the relationship between the change in the magnetization direction in the second ferromagnetic layer 43 and the magnetization direction of the first ferromagnetic layer 41, the electrical resistance changes, and the fringing magnetic field from the magnetic disk is detected by a voltage change based on the change in the electrical resistance.

In order to fabricate the magnetoresistive element 50 shown in FIG. 8, as shown in FIG. 9, the individual layers from the antiferromagnetic layer 40 to the second ferromagnetic layer 43 are formed in a vacuum, and by performing heat treatment (annealing) in a magnetic field, an exchange anisotropic magnetic field is produced at the interface between the first ferromagnetic layer 41 and the antiferromagnetic layer 40, and the magnetization direction of the first ferromagnetic layer 41 is fixed in the Y direction in the drawing. The above structure is then taken out into air, and a lift-off resist layer 51 having a width substantially corresponding to the track width T is formed as shown in FIG. 10. Next, as shown in FIG. 11, the bias layer 44 and the electrode layer 45 are formed on the surface of the second ferromagnetic layer 43 including the lift-off resist layer 51, and then the lift-off resist layer 51 is removed, and by aligning the magnetization direction of the second ferromagnetic layer 43 in the track width direction, the magnetoresistive element 50 shown in FIG. 8 is obtained.

However, in the conventional magnetoresistive element 50 described above, in order to form the lift-off resist layer 51 shown in FIG. 10, after the individual layers from the antiferromagnetic layer 40 to the second ferromagnetic layer 43 are formed in a vacuum and the magnetization direction of the first ferromagnetic layer 41 is fixed in the Y direction by performing heat treatment in a magnetic field, the structure must be taken out into air. Consequently, the surface of the second ferromagnetic layer 43 is brought into contact with air, and foreign matter, such as dust in air and contamination, adheres to the surface. As a result, it is not possible to sufficiently bring the second ferromagnetic layer 43 and the pair of-bias layers 44 into close contact with each other, and magnetic coupling between the second ferromagnetic layer 43 and the pair of bias layers 44 becomes insufficient, resulting in the occurrence of domain walls. Thereby, it is not possible to avoid Barkhausen noise which is caused by irregular movement of domain walls.

SUMMARY OF THE INVENTION

Accordingly, it is an object of the present invention to provide a magnetoresistive element and a method of making the same in which a second ferromagnetic layer and a bias layer can be magnetically coupled to each other satisfactorily, and Barkhausen noise can be prevented from occurring.

In accordance with one aspect of the present invention, a magnetoresistive element includes a nonmagnetic conductive layer, first and second ferromagnetic layers which are conductive and which sandwich the nonmagnetic conductive layer, an antiferromagnetic layer magnetically coupled to the first ferromagnetic layer for fixing the magnetization direction of the first ferromagnetic layer, a bias layer magnetically coupled to the second ferromagnetic layer for aligning the magnetization direction of the second ferromagnetic layer in a direction crossing to the magnetization direction of the first ferromagnetic layer, and a pair of electrode layers for applying a sensing current to the first and second ferromagnetic layers and the nonmagnetic conductive layer. The antiferromagnetic layer, the first ferromagnetic layer, the nonmagnetic conductive layer, the second ferromagnetic layer, and the bias layer are deposited in that order. The pair of electrode layers are disposed on both ends of the bias layer, and the bias layer located between the pair of electrode layers is modified to form a nonmagnetic layer for determining a track width.

Preferably, the thickness of the nonmagnetic layer is set smaller than that of the bias layer disposed on either side of the nonmagnetic layer.

Preferably, the bias layer is composed of an antiferromagnetic material.

Preferably, the nonmagnetic layer is composed of a mixture in which at least one element selected from the group consisting of oxygen, nitrogen, and boron is mixed with the antiferromagnetic material.

Preferably, the bias layer is composed of an X—Mn alloy, where X is at least one element selected from the group consisting of Pt, Pd, Ru, Rh, Ir, and Os.

In accordance with another aspect of the present invention, in a method of fabricating a magnetoresistive element including a laminate which includes a nonmagnetic conductive layer, first and second ferromagnetic layers which are conductive and which sandwich the nonmagnetic conductive layer, an antiferromagnetic layer magnetically coupled to the first ferromagnetic layer for fixing the magnetization direction of the first ferromagnetic layer, and a bias layer magnetically coupled to the second ferromagnetic layer for aligning the magnetization direction of the second ferromagnetic layer in a direction crossing to the magnetization direction of the first ferromagnetic layer, the method includes the steps of forming the laminate by depositing the antiferromagnetic layer, the first ferromagnetic layer, the nonmagnetic conductive layer, the second ferromagnetic layer, and the bias layer in that order; forming a pair of electrode layers for applying a sensing current to the first and second ferromagnetic layers and the nonmagnetic conductive layer on the bias layer with a distance corresponding to a track width therebetween; and modifying the bias layer located between the pair of electrode layers by plasma treatment to form a nonmagnetic layer.

BRIEF DESCRIPTION OF THE DRAWINGS

FIG. 6 is a sectional view illustrating a state in which a nonmagnetic layer is formed in the method of fabricating the magnetoresistive element in the first embodiment of the present invention;

DESCRIPTION OF THE PREFERRED EMBODIMENTS

A first embodiment of a magnetoresistive element of the present invention will be described with reference to FIGS. 1 to 6, in which the magnetoresistive element is used for a magnetic head.

Figure 1:
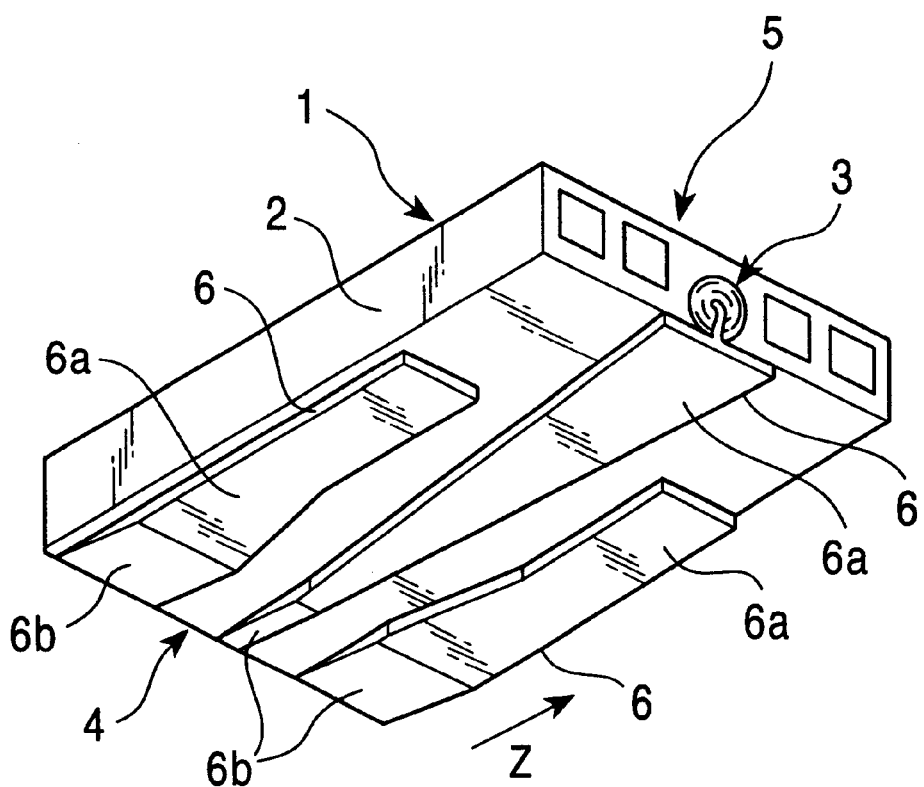
FIG. 1 is a perspective view of a magnetic head provided with a magnetoresistive element in a first embodiment of the present invention.

As shown in FIG. 1, a magnetic head 1 includes a slider 2 composed of a nonmagnetic material, such as an $Al_2O_3$—TiC ceramic, for maintaining a predetermined distance between the magnetic head 1 and a magnetic disk when the magnetic disk is rotated, and a magnetic core 3 formed on the edge of the slider 2.

One end of the slider 2 is a leading side 4 upstream of the rotating direction of the magnetic disk (the direction indicated by arrow Z), and the other end of the slider 2 is a trailing side 5 downstream of the rotating direction of the magnetic disk. On the surface facing the magnetic disk, three rail sections 6 protrude with a separation therebetween. Each of the rail sections 6 has an air bearing surface 6a, which is very flat, and a tapered surface 6b located on the leading side 4.

The magnetic core 3 includes a read head 7 and a write head 8 (see FIG. 2) which are deposited in that sequence on the edge of the slider 2 on the trailing side 5.

Figure 2:
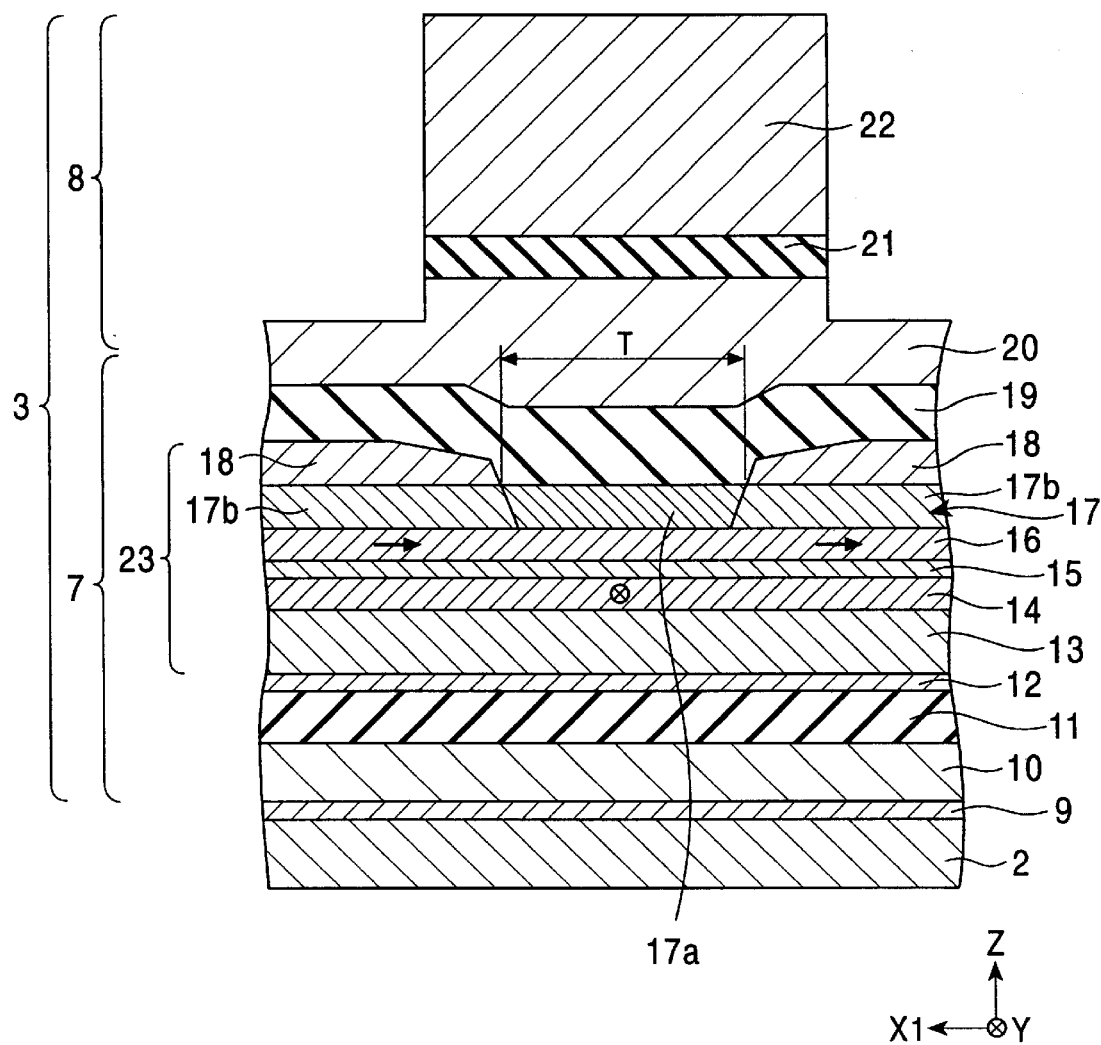
FIG. 2 is a sectional view of the magnetoresistive element in the first embodiment of the present invention.

FIG. 2 is a sectional view of the magnetic core 3, viewed from the side facing the magnetic disk. In the read head 7, an underlying layer 9, a lower shielding layer 10, a lower gap layer 11, an underlying layer 12, an antiferromagnetic layer 13, a first ferromagnetic layer 14, a nonmagnetic conductive layer 15, a second ferromagnetic layer 16, and a bias layer 17 are deposited in that order on the edge of the slider 2 on the trailing side 5. A pair of electrode layers 18 are formed on both sides of the bias layer 17 with a distance corresponding to a track width T of the magnetic disk therebetween, and an upper gap layer 19 is deposited so as to cover the pair of electrode layers 18 and the bias layer 17 located between the pair of electrode layers 18. An upper shielding layer 20 which also acts as a lower core layer of the write head 8 is further deposited on the upper gap layer 19. A nonmagnetic layer 17a for determining the track width T is formed by modifying the bias layer 17 between the pair of electrode layers 18.

In the write head 8, a gap layer 21 is formed on the lower core layer 20, and an upper core layer 22 is formed thereon.

The antiferromagnetic layer 13, the first ferromagnetic layer 14, the nonmagnetic conductive layer 15, the second ferromagnetic layer 16, the bias layer 17 including the nonmagnetic layer 17a, and the pair of electrode layers 18 constitute a magnetoresistive element 23.

Next, the individual layers in the read head 7 will be described in detail.

The upper shielding layer 20 and the lower shielding layer 10 prevent magnetic fields other than a fringing magnetic field from the magnetic disk from affecting the second ferromagnetic layer 16, are composed of a soft magnetic material, such as an NiFe alloy, an NiCo alloy, a CoZrNb alloy, a CoHfTa, alloy, or a Co-based amorphous alloy, and have a thickness of 0.5 to 3 μm.

The upper gap layer 19 and the lower gap layer 11 insulate the magnetoresistive element 23 from the upper shielding layer 20 and the lower shielding layer 10, respectively, are composed of a nonmagnetic insulator, such as $Al_2O_3$ or AlN, and have a thickness of 0.4 to 1 μm.

The antiferromagnetic layer 13 fixes the magnetization direction of the first ferromagnetic layer 14, and is composed of an alloy containing at least one element selected from the group consisting of Pt, Pd, Ir, Rh, Ru, Ir, Os, Au, Ag, Cr, Ni, Ne, Ar, Xe, and Kr, and Mn. The antiferromagnetic layer 13 composed of such an alloy has superior heat resistance and corrosion resistance.

The first ferromagnetic layer 14 is composed of, for example, a Co film, an NiFe alloy, a CoNiFe alloy, a CoFe alloy, or a CoNi alloy. The first ferromagnetic layer 14 is magnetized by an exchange anisotropic magnetic field due to exchange coupling occurring at the interface with the antiferromagnetic layer 13, and the antiferromagnetic layer 13 and the first ferromagnetic layer 14 are magnetically coupled to each other. The magnetization direction of the first ferromagnetic layer 14 is fixed in the Y direction in FIG. 2, i.e., in the direction crossing to the magnetic disk (in the height direction) due to the coupling.

The bias layer 17 is composed of a conductive antiferromagnetic material comprising an alloy containing at least one element selected from the group consisting of Pt, Pd, Rh, Ru, Ir, and Os, and Mn, and has a thickness of approximately 120 angstroms. The bias layer 17 composed of such an alloy has superior heat resistance and corrosion resistance. The central section of the bias layer 17 is modified by plasma treatment to form the nonmagnetic layer 17a for determining the track width T, and both sides of the nonmagnetic layer 17a remain as antiferromagnetic layers 17b.

The second ferromagnetic layer 16, the same as the first ferromagnetic layer 14, is composed of, for example, a Co film, an NiFe alloy, a CoNiFe alloy, a CoFe alloy, or a CoNi alloy. The second ferromagnetic layer 16 is magnetized by an exchange anisotropic magnetic field of the bias layer 17, is magnetically coupled to the bias layer 17 in regions in which the second ferromagnetic layer 16 is in direct contact with the antiferromagnetic layers 17b of the bias layer 17, and is aligned in a single-domain state as a whole. The magnetization direction of the second ferromagnetic layer 16 is aligned in the direction opposite to the X1 direction in the drawing, i.e., in the direction crossing to the magnetization direction of the first ferromagnetic layer 14 (in the direction of the track width T). Due to the single-domain state, in the regions in which the second ferromagnetic layer 16 and the antiferromagnetic layers 17b of the bias layer 17 are in direct contact with each other, the magnetization direction of the second ferromagnetic layer 16 is fixed in the direction opposite to the X1 direction, and domain walls are inhibited from appearing in the second ferromagnetic layer 16, and thus Barkhausen noise is prevented from occurring. In the region in which the second ferromagnetic layer 16 is in direct contact with the nonmagnetic layer 17a, the magnetization direction of the second ferromagnetic layer 16 is not fixed and is rotatable when a fringing magnetic field from the magnetic disk is applied.

The nonmagnetic conductive layer 15 is composed of a nonmagnetic conductive material, such as Cu, Au, or Ag, is disposed between the first ferromagnetic layer 14 and the second ferromagnetic layer 16, and has a thickness of 1 to 5 nm.

The pair of electrode layers 18 apply a sensing current to the first and second ferromagnetic layers 14 and 16 and the nonmagnetic conductive layer 15, and is composed of a nonmagnetic conductive material, such as Au, W, Cr, or Ta, having small electrical resistance.

Next, a method of fabricating the magnetoresistive element 23 having such a structure will be described.

Figure 3:
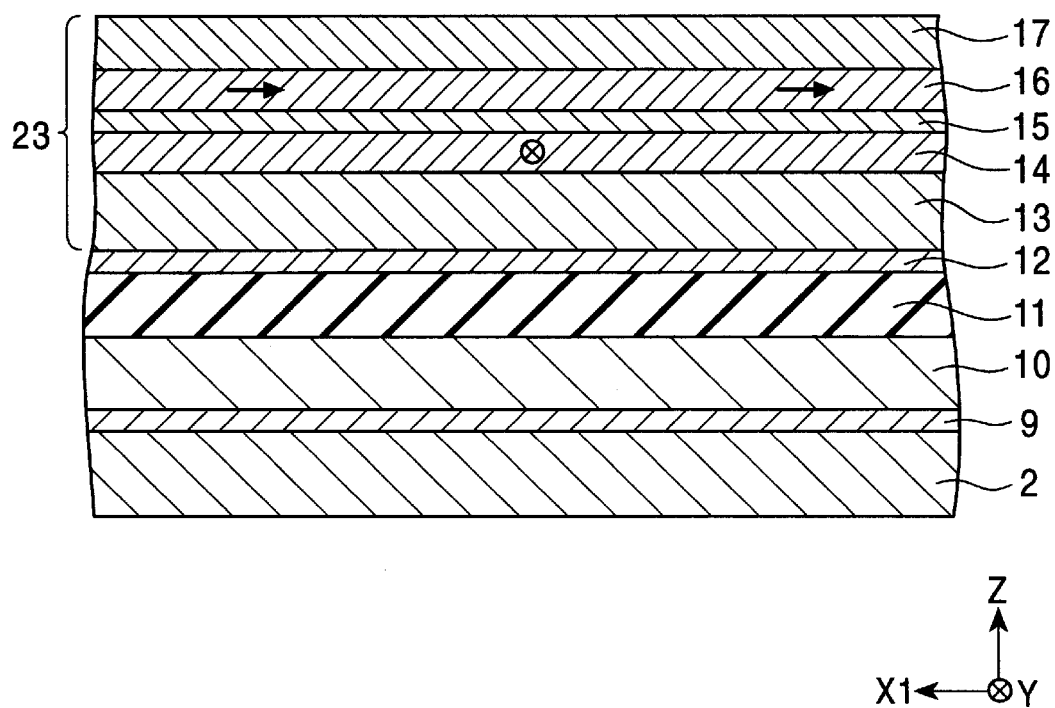
FIG. 3 is a sectional view illustrating a state in which a laminate is formed in a method of fabricating the magnetoresistive element in the first embodiment of the present invention.

First, a laminate 23 shown in FIG. 3 is formed by depositing, in a vacuum, the antiferromagnetic layer 13, the first ferromagnetic layer 14, the nonmagnetic conductive layer 15, the second ferromagnetic layer 16, and the bias layer 17 in that order on the underlying layer 12 formed above the edge of the slider 2 on the trailing side 5 with the underlying layer 9, the lower shielding layer 10, and the lower gap layer 11 therebetween. The laminate 23 is then subjected to heat treatment at a first heat-treating temperature while applying a first magnetic field to the laminate 23 in the direction (the Y direction) perpendicular to the direction opposite to the X1 direction (direction of the track width T) to generate exchange anisotropic magnetic fields in the antiferromagnetic layer 13 and the bias layer 17, and the magnetizations of the first ferromagnetic layer 14 and the second ferromagnetic layer 16 are fixed in the same direction (in the Y direction), and also the exchange anisotropic magnetic field of the antiferromagnetic layer 13 is set larger than the exchange anisotropic magnetic field of the bias layer 17.

Next, while a second magnetic field which is larger than the exchange anisotropic magnetic field of the bias layer 17 and is smaller than the anisotropic magnetic field of the antiferromagnetic layer 13 is applied in the direction of the track width T, the laminate 23 is subjected to heat treatment at a second heat-treating temperature that is higher than the first heat-treating temperature to apply a bias magnetic field to the second ferromagnetic layer 16 in the direction (the direction of the track width T) perpendicular to the magnetization direction of the first ferromagnetic layer 14.

Figure 4:
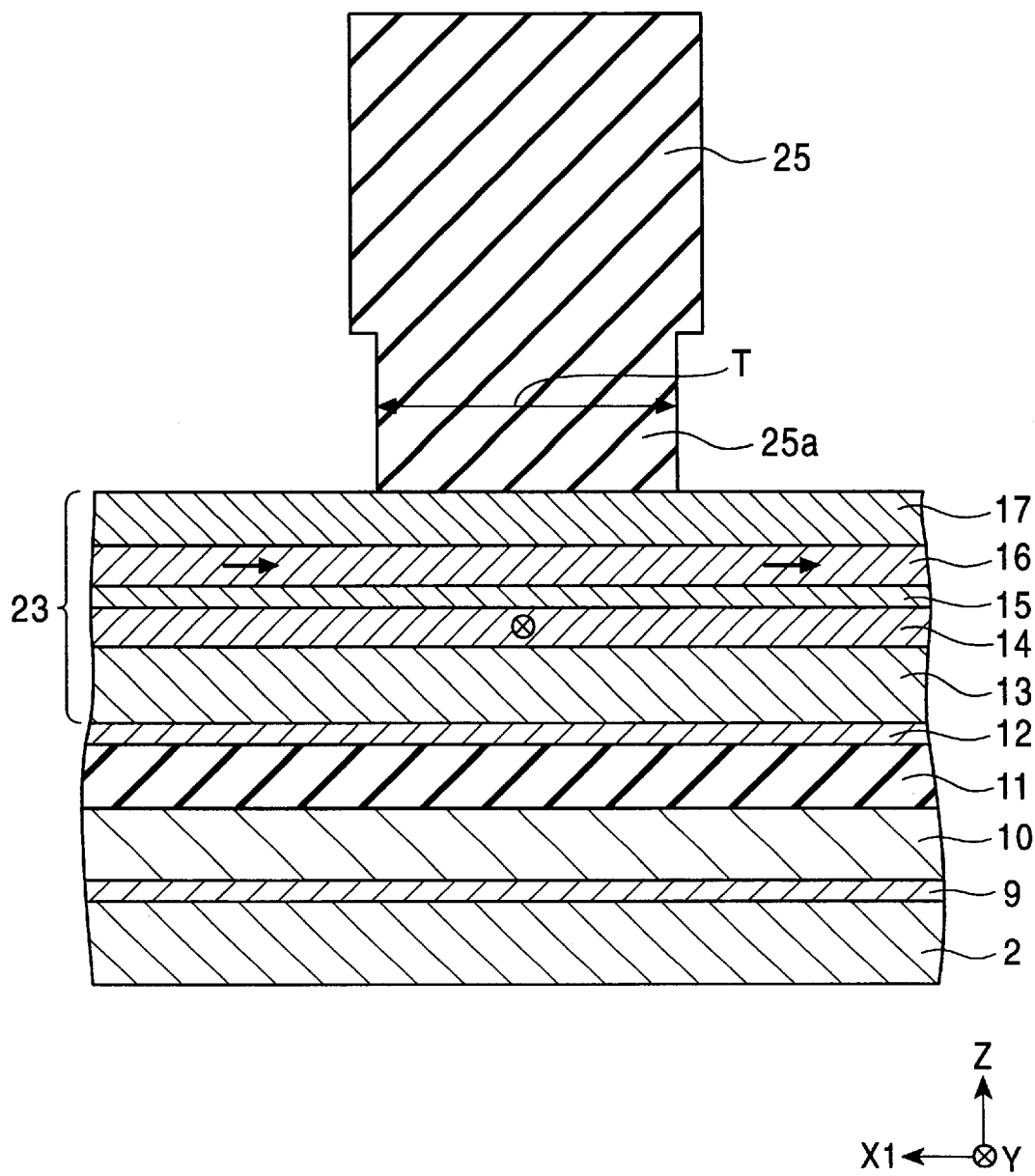
FIG. 4 is a sectional view illustrating a state in which a lift-off resist layer is formed in the method of fabricating the magnetoresistive element in the first embodiment of the present invention.
Figure 5:
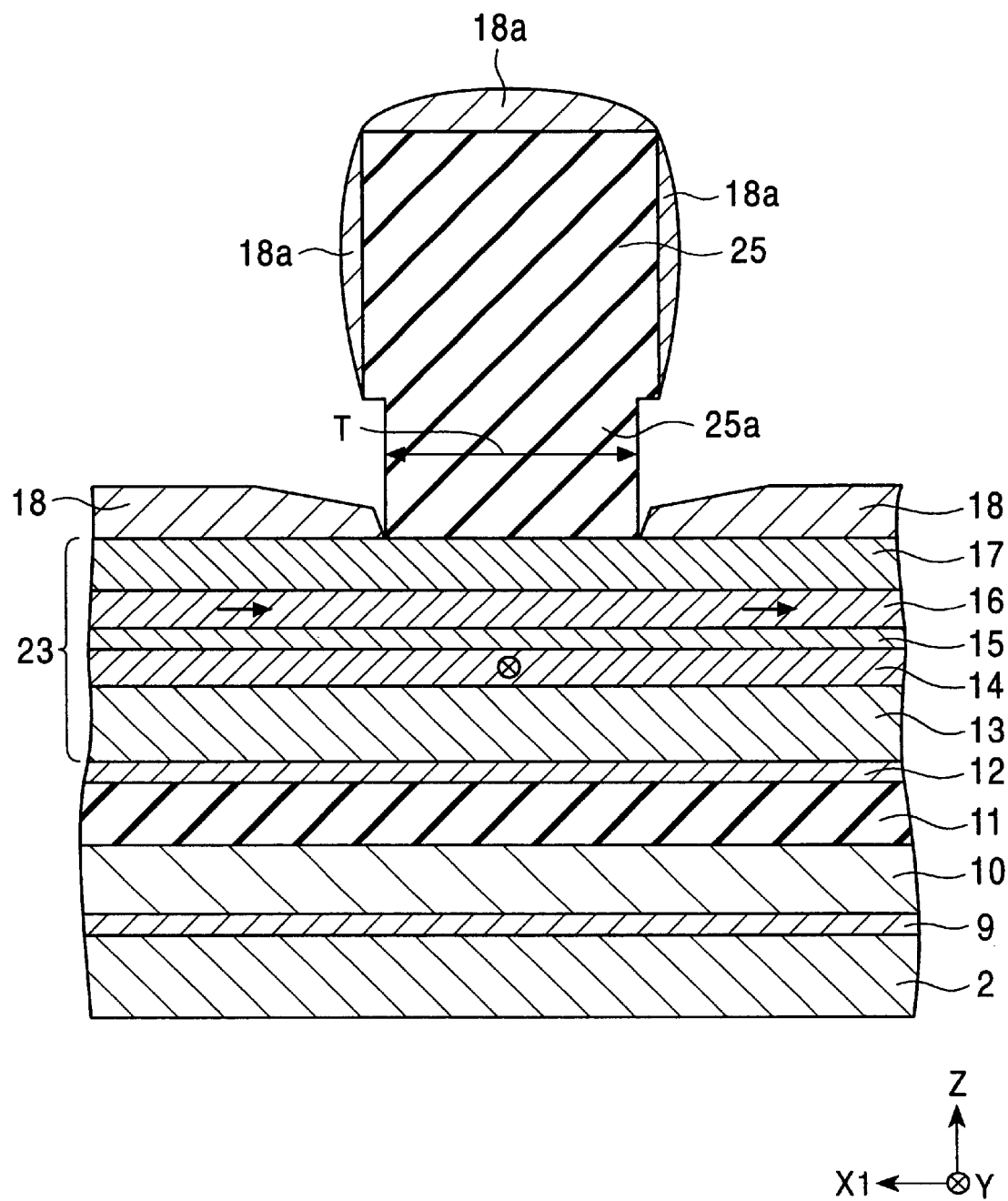
FIG. 5 is a sectional view illustrating a state in which electrode layers are formed in the method of fabricating the magnetoresistive element in the first embodiment of the present invention.

The laminate 23 together with the slider 2 is then taken out of the vacuum into air, and, as shown in FIG. 4, a lift-off resist layer 25 having a lower section 25a with the same width as the track width T is formed on the laminate 23 which has been subjected to the heat treatment. Next, as shown in FIG. 5, an electrode layer 18a is formed on the surface of the lift-off resist layer 25 and the electrode layer 18 is also formed on the bias layer 17. By removing the lift-off resist layer 25, the pair of electrode layers 18 are formed on the bias layer 17 as shown in FIG. 6.

By performing plasma treatment in which the bias layer 17 is subjected to ashing using an $O_2$ plasma between the pair of electrode layers 18, the central section of the bias layer 17 is modified by oxidation, and the nonmagnetic layer 17a for determining the track width T is formed. Consequently, the nonmagnetic layer 17a is composed of a mixture in which oxygen is mixed with the antiferromagnetic material.

In the magnetoresistive element 23 thus fabricated, the magnetization direction of the first ferromagnetic layer 14 is fixed in the Y direction in the drawing by the exchange anisotropic magnetic field due to exchange coupling occurring at the interface with the antiferromagnetic layer 13, the magnetization direction of the second ferromagnetic layer 16 is aligned in the direction (the direction opposite to the X1 direction) perpendicular to the magnetization direction of the first ferromagnetic layer 14 by the exchange anisotropic magnetic field of the bias magnetic layer 17, and the magnetization direction of the second ferromagnetic layer 16 is fixed in the direction opposite to the X1 direction in the drawing in the regions in which the second ferromagnetic layer 16 is in direct contact with the antiferromagnetic layers 17b of the bias layer 17. Since the nonmagnetic layer 17a determines the track width T and inhibits the second ferromagnetic layer 16 and the bias layer 17 from forming direct magnetic exchange coupling, in the region in which the second ferromagnetic layer 16 is in direct contact with the nonmagnetic layer 17a, the magnetization direction of the second ferromagnetic layer 16 is not fixed and is rotatable when a fringing magnetic field from the magnetic disk is applied.

The magnetic head 1 provided with the magnetoresistive element 23 having the structure described above and fabricated as described above is assembled into a magnetic disk unit. A sensing current (steady-state current) is applied from the pair of the electrode layers 18 to the second ferromagnetic layer 16, the nonmagnetic conductive layer 15, and the first ferromagnetic layer 14 through the antiferromagnetic layers 17b, and the nonmagnetic layer 17a is aligned with the track of the magnetic disk. When a fringing magnetic field from the magnetic disk rotating in the Z direction is applied in the Y direction in the drawing, the magnetization direction of the second ferromagnetic layer 16 in the section of the nonmagnetic layer 17a is changed from the direction opposite to the X1 direction to the Y direction. Because of the relationship between the change in the magnetization direction in the second ferromagnetic layer 16 and the magnetization direction of the first ferromagnetic layer 14, the electrical resistance of the magnetoresistive element 23 changes, and the fringing magnetic field from the magnetic disk is detected by a voltage change in response to the change in the electrical resistance. Consequently, the read head 7 of the magnetic head 1 can read information recorded in the magnetic disk.

Accordingly, in the magnetoresistive element 23, since the antiferromagnetic layer 13, the first ferromagnetic layer 14, the nonmagnetic conductive layer 15, the second ferromagnetic layer 16, and the bias layer 17 can be formed successively, the surface of the second ferromagnetic layer 16 is not brought into contact with air, and foreign matter, such as dust in air and contamination, does not adhere to the surface. As a result, it is possible to satisfactorily bring the second ferromagnetic layer 16 and the bias layer 17 into close contact with each other, and sufficient magnetic coupling between the second ferromagnetic layer 16 and the antiferromagnetic layers 17b of the bias layer 17 can be obtained, enabling the suppression of Barkhausen noise.

Additionally, when the nonmagnetic layer 17a is formed in the bias layer 17, although plasma treatment in which ashing is performed using the $O_2$ plasma is described in this embodiment, the bias layer 17 may be subjected to plasma treatment in which ashing is performed using a nitrogen plasma or a boron plasma to form the nonmagnetic layer 17a, and the nonmagnetic layer 17a may be composed of a mixture in which nitrogen or boron is mixed into the antiferromagnetic material. In plasma treatment, at least two plasmas selected from the group consisting of an $O_2$ plasma, a nitrogen plasma, and a boron plasma many be combined, and the nonmagnetic layer 17a may be composed of a mixture in which at least 2 elements selected from the group consisting of oxygen, nitrogen, and boron are mixed into the antiferromagnetic material.

Figure 7:
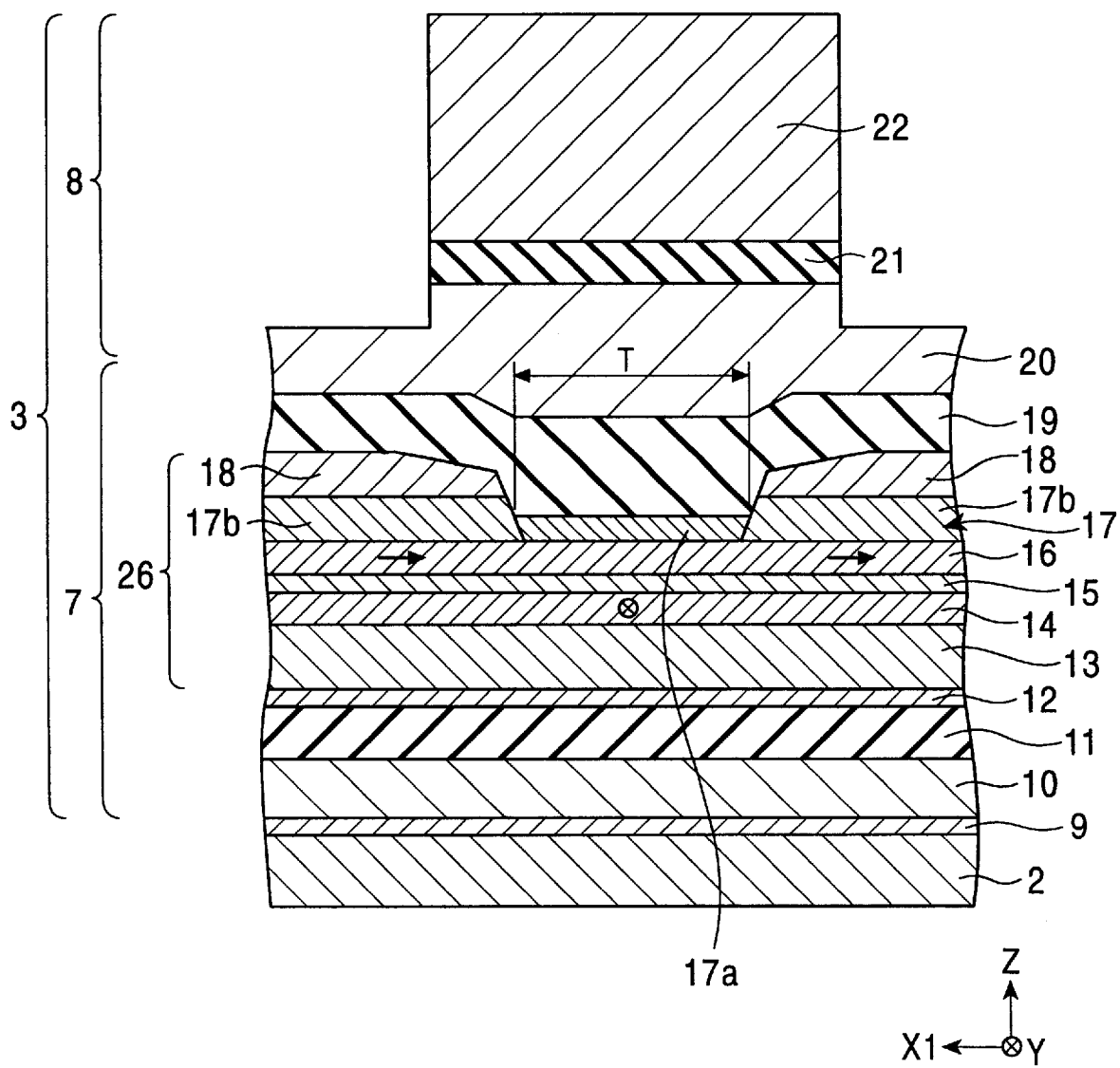
FIG. 7 is a sectional view of a magnetoresistive element in a second embodiment of the present invention.
Figure 8:
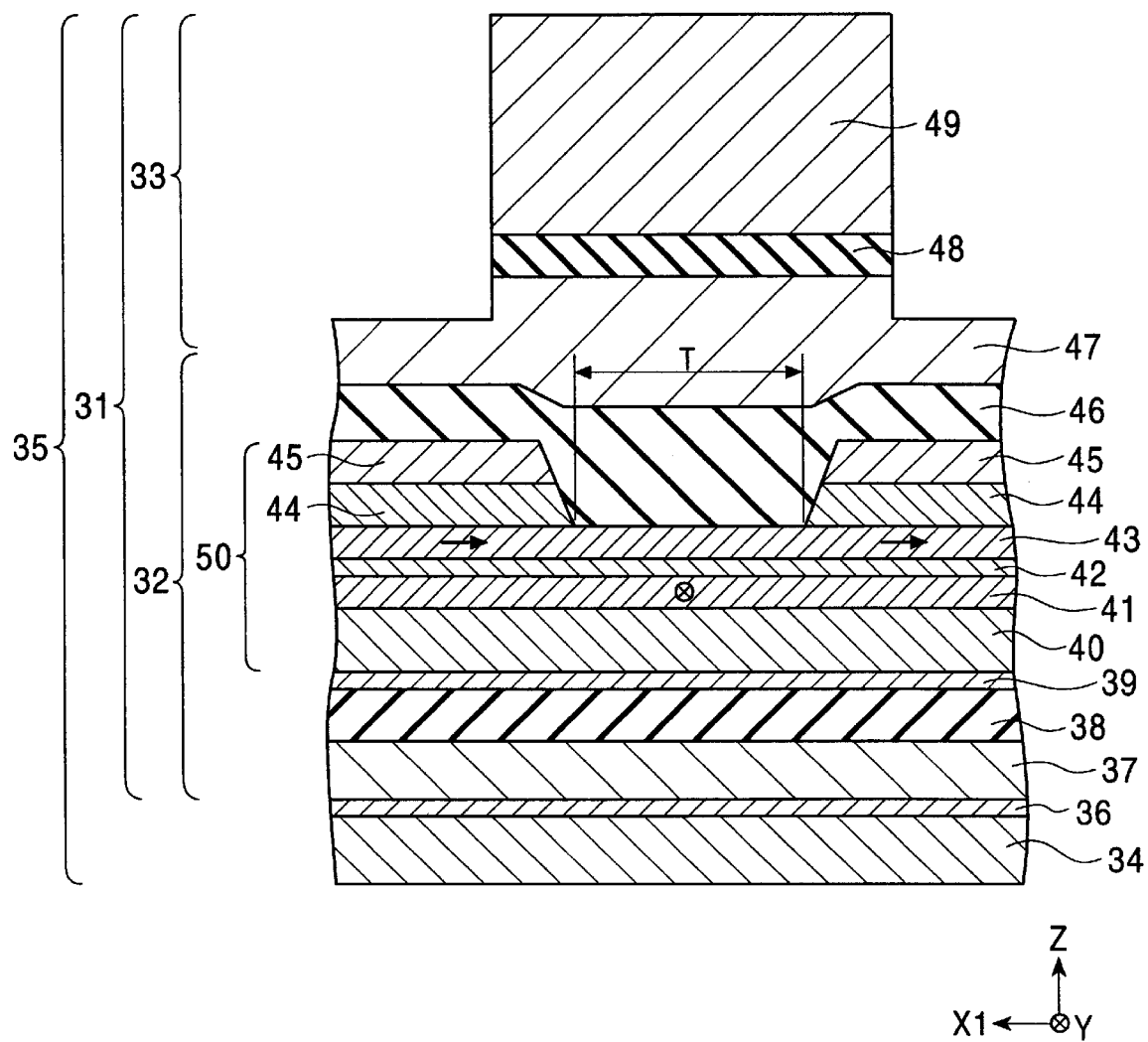
FIG. 8 is a sectional view of a conventional magnetoresistive element.
Figure 9:
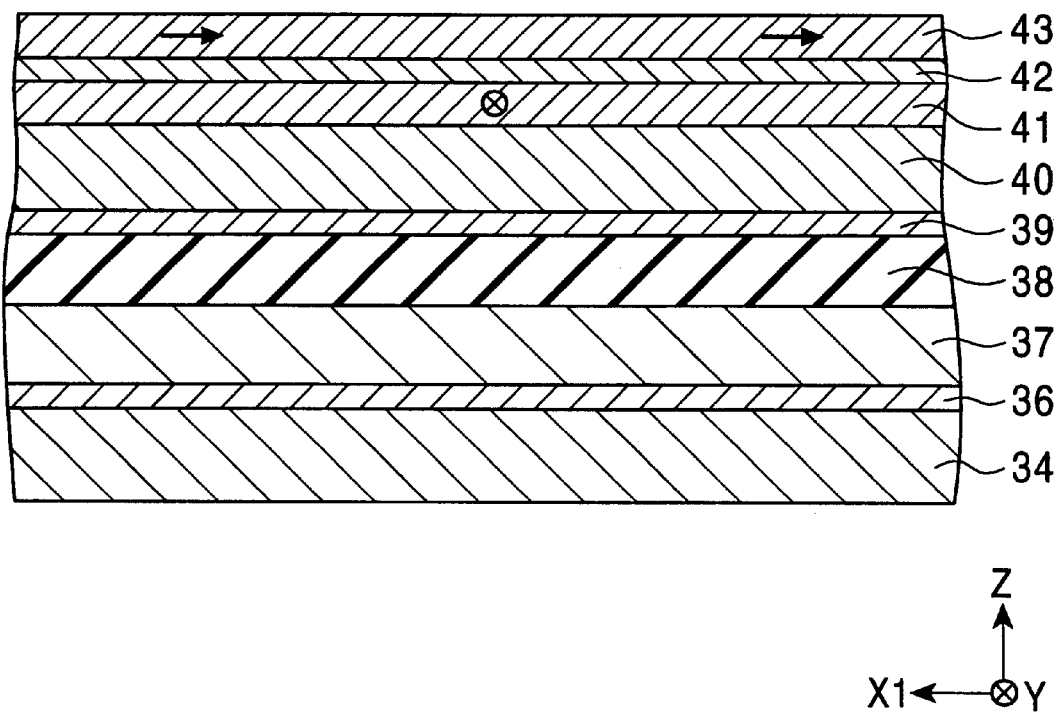
FIG. 9 is a sectional view illustrating a state in which an antiferromagnetic layer, a first ferromagnetic layer, a nonmagnetic conductive layer, and a second ferromagnetic layer are formed in a method of fabricating the conventional magnetoresistive element.
Figure 10:
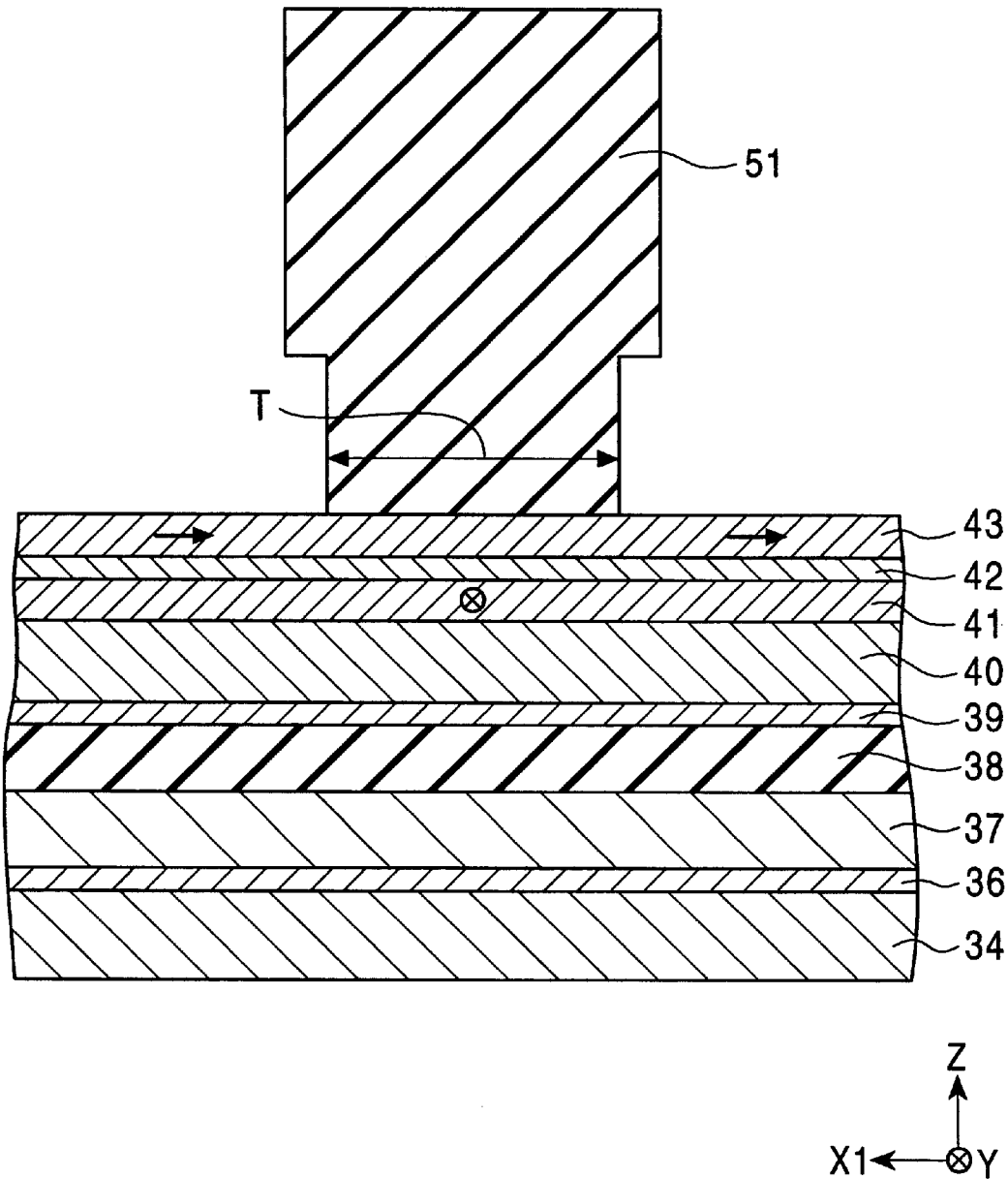
FIG. 10 is a sectional view illustrating a state in which a lift-off resist layer is formed in the method of fabricating the conventional magnetoresistive element.
Figure 11:
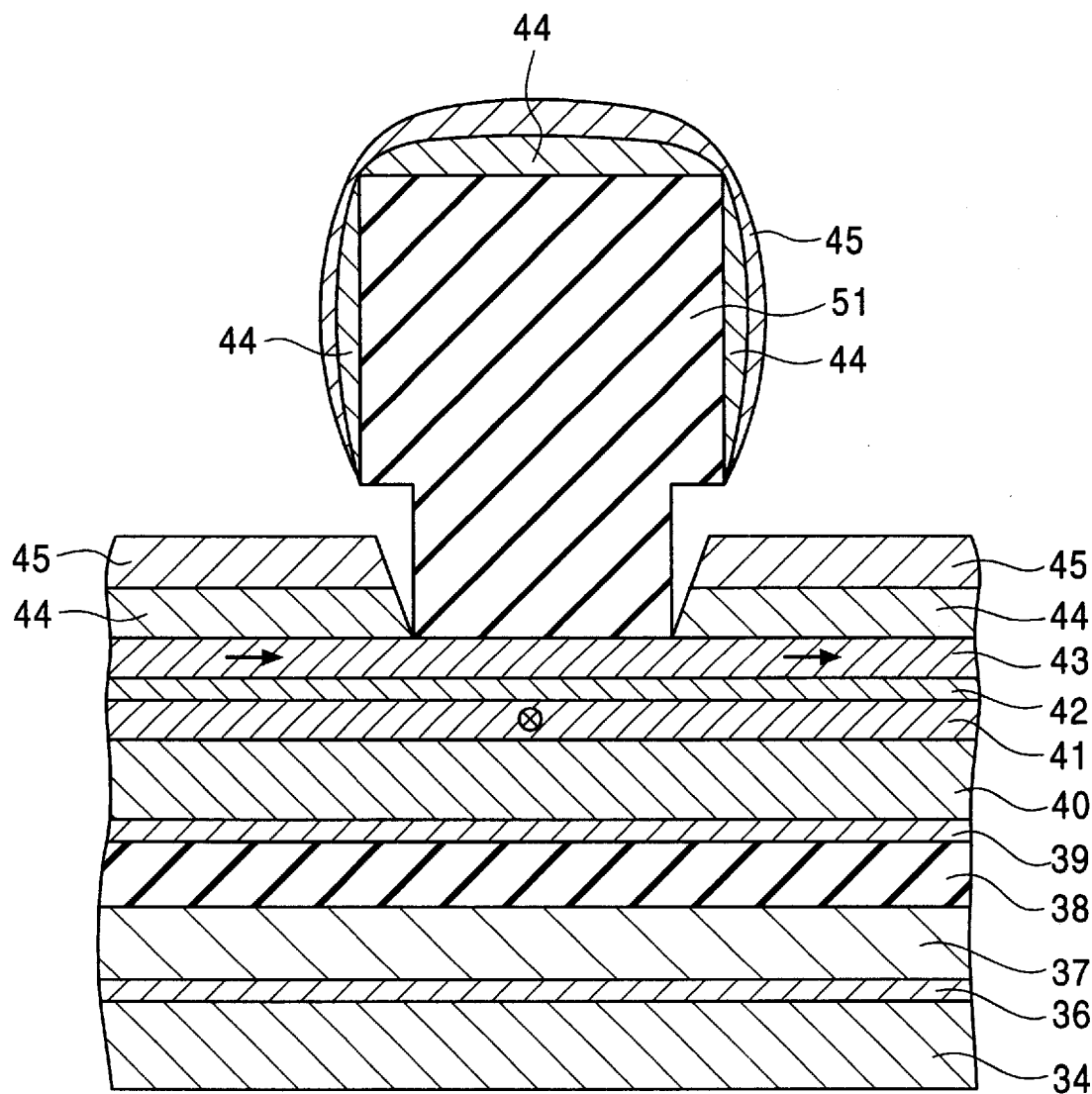
FIG. 11 is a sectional view illustrating a state in which bias layers and electrode layers are formed in the method of fabricating the conventional magnetoresistive element.

Next, a second embodiment of a magnetoresistive element of the present invention will be described with reference to FIG. 7.

A magnetoresistive element 26 in the second embodiment differs from the magnetoresistive element 23 in the first embodiment.in that after a bias layer 17 is subjected to plasma treatment to form a nonmagnetic layer 17a in a manner similar to that in the first embodiment, ion milling is further performed so that the thickness of the nonmagnetic layer 17a is decreased in comparison with the thickness of the bias layers 17 disposed on both sides of the nonmagnetic layer 17a, i.e., antiferromagnetic layers 17b. In other respects, the magnetoresistive element 26 is similar to the magnetoresistive element 23 in the first embodiment.

Although a sensing current from a pair of electrode layers 18 is applied to a second ferromagnetic layer 16, a nonmagnetic conductive layer 15, and a first ferromagnetic layer 14 through the antiferromagnetic layers 17b of the bias layer 17, when the nonmagnetic layer 17a is electrically conductive, a fraction of the sensing current is shunted to the nonmagnetic layer 17a without passing through the second ferromagnetic layer 16, the nonmagnetic conductive layer 15 and the first ferromagnetic layer 14. The sensing current shunted to the nonmagnetic layer 17a does not influence the change in voltage based on the change in the electrical resistance of the magnetoresistive element 23 when a fringing magnetic field from the magnetic disk is applied.

As described above, although the detection accuracy of the fringing magnetic field from the magnetic disk tends to be decreased as the amount of the sensing current shunted to the nonmagnetic layer 17a is increased, in the second embodiment, since the thickness of the nonmagnetic layer 17a is set smaller than that of the antiferromagnetic layers 17b, the electrical resistance of the nonmagnetic layer 17a is increased in comparison with the first embodiment, and therefore the amount of the sensing current shunted to the nonmagnetic layer 17a can be reduced. Accordingly, a larger amount of sensing current can be applied to the second ferromagnetic layer 16, the nonmagnetic conductive layer 15, and the first ferromagnetic layer 14, and the detection accuracy of the fringing magnetic field from the magnetic disk can be improved.

The present invention can be implemented as described in the above embodiments and the following advantages are obtainable.

In accordance with the present invention, a magnetoresistive element includes a nonmagnetic conductive layer, first and second ferromagnetic layers which are conductive and which sandwich the nonmagnetic conductive layer, an antiferromagnetic layer magnetically coupled to the first ferromagnetic layer for fixing the magnetization direction of the first ferromagnetic layer, a bias layer magnetically coupled to the second ferromagnetic layer for aligning the magnetization direction of the second ferromagnetic layer in a direction crossing to the magnetization direction of the first ferromagnetic layer, and a pair of electrode layers for applying a sensing current to the first and second ferromagnetic layers and the nonmagnetic conductive layer. The antiferromagnetic layer, the first ferromagnetic layer, the nonmagnetic conductive layer, the second ferromagnetic layer, and the bias layer are deposited in that order. The pair of electrode layers are disposed on both ends of the bias layer, and the bias layer located between the pair of electrode layers is modified to form a nonmagnetic layer for determining a track width. Accordingly, the antiferromagnetic layer, the first ferromagnetic layer, the nonmagnetic conductive layer, the second ferromagnetic layer, and the bias layer can be formed successively, and it is possible to avoid the adhesion of dust and contamination to the surface of the second ferromagnetic layer because it is not brought into contact with air. Therefore, since the second ferromagnetic layer and the bias layer can be sufficiently brought into close contact with each other to secure the sufficient magnetic coupling between the second ferromagnetic layer and the bias layer, it is possible to prevent Barkhausen noise from occurring.

Furthermore, since the thickness of the nonmagnetic layer is set smaller than that of the bias layer disposed on either side of the nonmagnetic layer, a larger amount of the sensing current can be applied to the second ferromagnetic layer, the nonmagnetic conductive layer, and the first ferromagnetic layer, thus improving the detection accuracy of an external magnetic field, such as a fringing magnetic field from a magnetic disk.

Since the bias layer is composed of an antiferromagnetic material, the magnetization direction of the second ferromagnetic layer can be aligned in the direction crossing to the magnetization direction of the first ferromagnetic layer and can be aligned in a single-domain state, the bias layer is magnetically coupled to the second ferromagnetic layer satisfactorily, thus suppressing Barkhausen noise.

Since the nonmagnetic layer is composed of a mixture in which at least one element selected from the group consisting of oxygen, nitrogen, and boron is mixed with an antiferromagnetic material, it is possible to form the nonmagnetic layer by modifying a portion of the bias layer.

Furthermore, since the bias layer is composed of an X-Mn alloy, where X is at least one element selected from the group consisting of Pt, Pd, Ru, Rh, Ir, and Os, it is possible to obtain a magnetoresistive element having superior heat resistance and corrosion resistance.

In accordance with the present invention, in a method of fabricating a magnetoresistive element including a laminate which includes a nonmagnetic conductive layer, first and second ferromagnetic layers which are conductive and which sandwich the nonmagnetic conductive layer, an antiferromagnetic layer magnetically coupled to the first ferromagnetic layer for fixing the magnetization direction of the first ferromagnetic layer, and a bias layer magnetically coupled to the second ferromagnetic layer for aligning the magnetization direction of the second ferromagnetic layer in a direction crossing to the magnetization direction of the first ferromagnetic layer, the method includes the steps of forming the laminate by depositing the antiferromagnetic layer, the first ferromagnetic layer, the nonmagnetic conductive layer, the second ferromagnetic layer, and the bias layer in that order; forming a pair of electrode layers for applying a sensing current to the first and second ferromagnetic layers and the nonmagnetic conductive layer on the bias layer with a distance corresponding to a track width therebetween; and modifying the bias layer located between the pair of electrode layers by plasma treatment to form a nonmagnetic layer. Accordingly, since the antiferromagnetic layer, the first ferromagnetic layer, the nonmagnetic conductive layer, the second ferromagnetic layer, and the bias layer can be formed successively, the surface of the second ferromagnetic layer is not brought into contact with air, and foreign matter, such as dust in air and contamination, does not adhere to the surface. As a result, the second ferromagnetic layer and the bias layer can be magnetically coupled to each other satisfactorily, resulting in a superior magnetoresistive element in which Barkhausen noise can be prevented from occurring.

What is claimed is:

1. A magnetoresistive element comprising:

a nonmagnetic conductive layer;

first and second ferromagnetic conductive layers sandwiching the nonmagnetic conductive layer;

an antiferromagnetic layer magnetically coupled to the first ferromagnetic layer for fixing the magnetization direction of the first ferromagnetic layer;

a pair of bias layers disposed on both ends of the second ferromagnetic layer, the pair of bias layers aligning the magnetization direction of the second ferromagnetic layer in a direction perpendicular to the magnetization direction of the first ferromagnetic layer; and a pair of electrode layers for applying a sensing current to the first and second ferromagnetic layers and the nonmagnetic conductive layer, wherein the antiferromagnetic layer, the first ferromagnetic layer, the nonmagnetic conductive layer, the second ferromagnetic layer, and the bias layers are deposited in that order;

the pair of electrode layers are disposed on both ends of the bias layer; and a nonmagnetic layer is disposed between the pair of electrode layers and between the bias layers, the nonmagnetic layer being formed by modifying the bias layer, and further wherein the bias layers comprise an antiferromagnetic material.

2. A magnetoresistive element according to claim 1, wherein the thickness of the nonmagnetic layer is smaller than that of the bias layer disposed on both sides of the nonmagnetic layer.

3. A magnetoresistive element according to claim 1, wherein the bias layer comprises an X—Mn alloy, where X is at least one element selected from the group consisting of Pt, Pd, Ru, Rh, Ir, and Os.

4. A magnetoresistive element according to claim 1, wherein the nonmagnetic layer comprises a mixture of the antiferromagnetic material and at least one element selected from the group consisting of oxygen, nitrogen, and boron.

5. A magnetoresistive element according to claim 4, wherein the bias layer comprises an X—Mn alloy, where X is at least one element selected from the group consisting of Pt, Pd, Ru, Rh, Ir, and Os.

* * * * *